April 26, 1949.    L. DINESEN    2,468,618
STALL COCK
Filed March 26, 1947
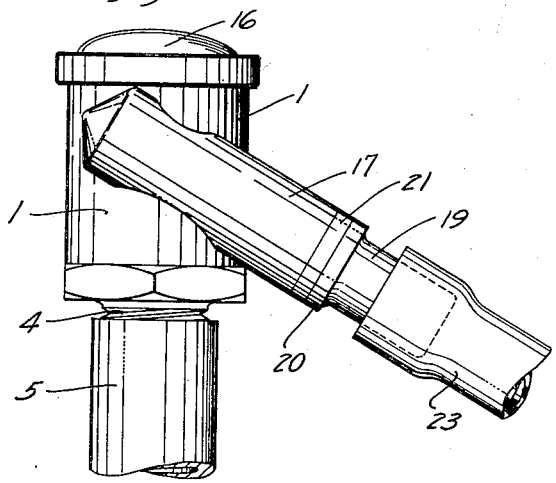
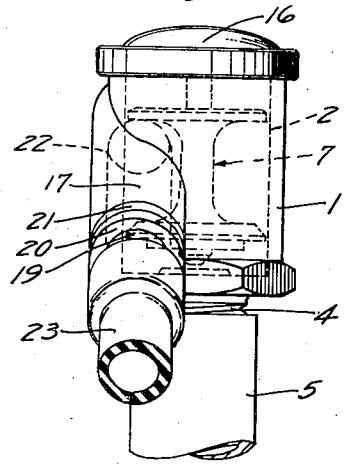
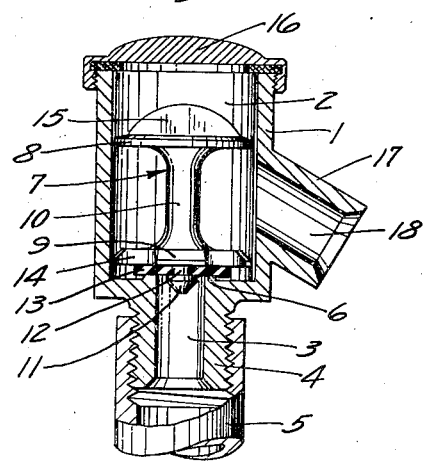
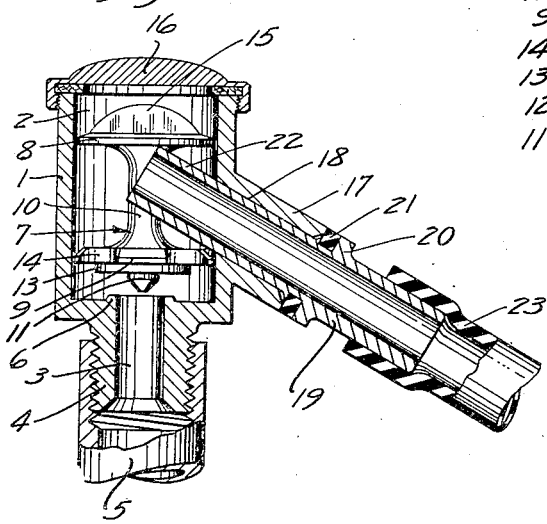
Inventor
Laurits Dinesen
By his Attorneys
Merchant & Merchant Patented Apr. 26, 1949

2,468,618

UNITED STATES PATENT OFFICE 2,468,618

STALL COCK

Laurits Dinesen, Minneapolis, Minn., assignor to Perfection Manufacturing Corporation, Minneapolis, Minn., a corporation of Minnesota Application March 26, 1947, Serial No. 737,250

2 Claims. (Cl. 284—17)

My invention relates generally to valves and more specifically to valves for use in vacuum lines or between points of differential air pressure.

My invention is particularly adapted for use in large vacuum pipe installations where it is desired to periodically tap into the line at various points. An example of this type of setup is a large cattle barn having vacuum tubing extending from a central source of vacuum into or adjacent to the individual stalls thereof for the purpose of running milking machines which are taken from one stall to another.

The primary object of my invention is the provision of a stall cock for the above uses, the valve of which will positively close under the action of gravity and differential in air pressure when not in use, but which valve will be automatically unseated by the insertion of a branch line into the valve body, so as to automatically place said branch line also under partial vacuum.

Another object of my invention is the provision of a stall cock, which can be manufactured at a minimum of cost, which is positive in its action, durable in use, easy to operate, and compact in size.

The above and still further objects of my invention will become apparent from the following detailed specification, appended claims, and attached drawings.

Referring to the drawings wherein like characters indicate like parts throughout the several views:

Fig. 1 is a view in side elevation, showing my stall cock connected to main and branch vacuum lines, some parts being broken away;

Fig. 2 is a front elevation of the parts shown in Fig. 1;

Fig. 3 is a view corresponding to Fig. 1, but showing some parts broken away and some parts shown in section; and Fig. 4 is a view corresponding to Fig. 3, but having some parts removed and illustrating a different position of some of the parts.

Referring with greater particularity to the drawings, my novel stall cock comprises a body member 1 having a valve chamber 2 which, as shown, is cylindrical in form. Valve chamber 2 is in communication with a bore 3 in a reduced axial extension 4 thereof and has communication therethrough with a source of partial vacuum, not shown, through a conduit 5 having threaded engagement with the reduced portion 4.

Upstanding from the bottom of the valve chamber 2 is an annular valve seat 6 concentric with the bore 3. A valve element, identified in its entirety by the numeral 7, is loosely contained within the chamber 2 and is biased, under the action of gravity, toward the valve seat 6. The valve 7 is made up of upper and lower axially-spaced cylindrical flanges 8 and 9 respectively connected by a diametrically reduced axially-extending stem 10. The flanges 8 and 9 and the connecting stem 10 may be formed in any suitable manner, but are preferably cast in one piece. On its under side, the flange 9 is formed with an axially-depending stem 11, which is undercut, as indicated at 12, to receive and retain a gasket 13. The gasket 13 may be made of rubber or any suitable resilient sealing material. The flange 9 is further provided with circumferentially-spaced notches 14 to permit communication between the chamber 2 above the flange 9 and the bore 3 when the valve 7 is opened, as indicated in Fig. 3.

The flanges 8 and 9 of the valve 7 are of a diameter, with respect to the valve chamber 2, to permit free reciprocal movements of the valve 7 in said chamber 2, while also acting as guide to prevent tilting, thus assuring constant alignment of the sealing gasket 13 with the valve seat 6. The flange 8 of the valve 7 is provided with an upstanding handle element 15 to facilitate removal of the valve 7 from the chamber 2. The upper end of the body 1 is threaded to receive a gasket-equipped closure cap 16.

A tubular extension 17 extends downwardly at approximately a 45 degree angle from the intermediate portion of the side of the body 1 and is provided with an axial bore 18 which communicates with the chamber 2 adjacent one side thereof. A tubular conduit terminal member 19 is provided with a circumferentially-extended shoulder-forming flange 20 intermediate its ends against the outer side of which is positioned a sealing ring 21. The axially-extended free end 22 of member 19 is of a diameter to be freely received within the bore 18 of the tubular extension 17, and the free end 22 is of a length to engage the underside of cylindrical flange 8 and lift the valve 7, in the chamber 2, from its seat 6 when the sealing ring 21 is in contact with the outer end of the tubular extension 17.

The numeral 23 indicates the end portion of a branch line conduit which is normally connected to a milker or the like, not shown.

It should be obvious from the above that, prior to the insertion of the tubular conduit terminal member 19 into the bore 18, the differential in air pressure within the conduit 5 and the chamber 2, and the action of gravity, will seat the valve 7 against the valve seat 6 through the sealing gasket 13, to maintain the desired amount of vacuum within the conduit 5. Upon insertion of the conduit terminal 19 into the bore 18, the extreme end of the extended portion 22 will engage the under side of the cylindrical flange 8 and lift the valve 7 away from engagement with the valve seat 6, whereby to introduce the conduit 23 and a milker associated therewith to the partial vacuum of conduit 5. The differential in air pressure between that of the conduit 5 and that of the conduit 23 will tend to retain the conduit terminal within the tubular extension 17 with the sealing ring 21 in sealing engagement with the end of the tubular extension 17.

As soon as the free end portion 22 is pulled away from engagement with the cylindrical flange 8, the valve 7 will again, under the action of gravity and differential in air pressure, drop into engagement with the valve seat 6.

While I have disclosed a commercial adaptation of my invention, it should be obvious that the same is capable of modification without departure from the scope of the appended claims.

What I claim is:

1. A valve mechanism comprising a body member having a vertically-disposed cylindrical valve chamber therein, an axially aligned bore communicating with said valve chamber and adapted to be connected with a vacuum source, a valve seat at the juncture of said bore and chamber, a valve element loosely mounted within said chamber for vertical movements to and from sealing engagement with said seat and normally seated thereon under differential air pressure, said valve element comprising a base member having a maximum width only slightly less than the diameter of said chamber, an axially spaced head having a maximum width only slightly less than the diameter of said valve chamber, and a reduced neck portion connecting said base member and head, said body member also being provided with a tubular extension the bore of which communicates tangentially with said valve chamber intermediate the base member and head of said valve element, and an elongated tubular conduit terminal insertable into said last-mentioned bore for engagement of the free end thereof with the head of the valve element to simultaneously raise said valve element from sealing engagement with said valve seat and to impart a partial rotary movement thereto.

2. A valve mechanism comprising a body member, a vertically-disposed valve chamber in said body portion, a bore in the base of said body member coaxial with said valve chamber and adapted to be connected to a vacuum source, a valve seat at the juncture of said bore and chamber, a valve loosely contained within said chamber for vertical and limited horizontal movements to and from sealing engagement with said valve seat and normally seated on said valve seat under differential air pressure, said valve having a maximum width only slightly less than the width of said chamber whereby when said valve is moved downwardly in said chamber the walls of said chamber will guide said valve to sealing engagement with said seat, said body also being provided with a second bore which communicates with the valve chamber above the valve seat in a position whereby an axial projection of said bore will intercept said valve, and an elongated tubular conduit terminal insertable in said last-mentioned bore for engagement within said chamber of the free end thereof with said valve to raise the same from its seat, said valve chamber being cylindrical and said valve including a circular head portion providing a shoulder for engagement by the tubular conduit terminal.

LAURITS DINESEN.

REFERENCES CITED

The following references are of record in the file of this patent:

UNITED STATES PATENTS

| Number | Name | Date |
|---|---|---|
| 200,944 | Smith | Mar. 5, 1878 |
| 2,251,071 | Scott | July 29, 1941 |
| 2,277,229 | Hulbert | Mar. 24, 1942 |
| 2,451,456 | Rawson | Oct. 12, 1948 |